(12) United States Patent
Terheiden et al.

(10) Patent No.: US 12,458,150 B2
(45) Date of Patent: Nov. 4, 2025

(54) SHAPED PU FOAM ARTICLES

(71) Applicant: Evonik Operations GmbH, Essen (DE)

(72) Inventors: Annegret Terheiden, Alpen (DE); Rüdiger Landers, Essen (DE); Daniela Hermann, Düsseldorf (DE); Jane Garrett Kniss, Kempton, PA (US); Robert Borgogelli, Midlothian, VA (US); Kathie W. Hogg, Mechanicsville, VA (US); Isabelle Denise Wessely, Karlsruhe (DE)

(73) Assignee: Evonik Operations GmbH, Essen (DE)

( * ) Notice: Subject to any disclaimer, the term of this patent is extended or adjusted under 35 U.S.C. 154(b) by 266 days.

(21) Appl. No.: 16/899,883

(22) Filed: Jun. 12, 2020

(65) Prior Publication Data

US 2021/0015269 A1    Jan. 21, 2021

Related U.S. Application Data

(60) Provisional application No. 62/876,062, filed on Jul. 19, 2019.

(51) Int. Cl.
| | |
|---|---|
| *A47C 27/00* | (2006.01) |
| *A47C 27/05* | (2006.01) |
| *A47C 27/20* | (2006.01) |
| *B65B 31/02* | (2006.01) |
| *C08G 18/16* | (2006.01) |
| *C08G 18/18* | (2006.01) |
| *C08G 18/24* | (2006.01) |
| *C08G 18/32* | (2006.01) |
| *C08G 18/48* | (2006.01) |
| *C08G 18/73* | (2006.01) |
| *C08G 18/76* | (2006.01) |
| *C08J 9/00* | (2006.01) |

(52) U.S. Cl.
CPC ............ *A47C 27/05* (2013.01); *A47C 27/20* (2013.01); *B65B 31/02* (2013.01); *C08G 18/3203* (2013.01); *C08G 18/73* (2013.01); *C08G 18/7621* (2013.01); *C08G 18/7657* (2013.01); *C08G 2110/0008* (2021.01); *C08G 2110/0083* (2021.01)

(58) Field of Classification Search
CPC .............. C08G 18/165; C08G 18/1825; C08G 2110/0008
See application file for complete search history.

(56) References Cited

U.S. PATENT DOCUMENTS

| | | |
|---|---|---|
| 2,834,748 A | 5/1958 | Bailey et al. |
| 2,917,480 A | 12/1959 | Bailey et al. |
| 3,346,557 A | 10/1967 | Patton, Jr. et al. |
| 3,346,577 A | 10/1967 | Patton, Jr. et al. |
| 3,629,308 A | 12/1971 | Bailey et al. |
| 3,933,695 A | 1/1976 | Omietanski et al. |
| 4,042,540 A | 8/1977 | Lammerting et al. |
| 4,147,847 A | 4/1979 | Schweiger |
| 4,855,379 A | 8/1989 | Budnik et al. |
| 5,306,737 A | 4/1994 | Burkhart et al. |
| 5,321,051 A | 6/1994 | Burkhart et al. |
| 5,357,018 A | 10/1994 | Burkhart et al. |
| 5,844,010 A | 12/1998 | Burkhart et al. |
| 5,859,079 A | 1/1999 | Mercando et al. |
| 6,359,022 B1 | 3/2002 | Hickey et al. |
| 7,671,103 B2 | 3/2010 | Eilbracht et al. |
| 7,671,104 B2 | 3/2010 | Heinemann et al. |
| 7,838,566 B2 | 11/2010 | Glos et al. |
| 8,293,808 B2 | 10/2012 | Herrington et al. |
| 8,334,355 B2 | 12/2012 | Henning et al. |
| 9,968,919 B2 * | 5/2018 | Burdeniuc ........... B01J 31/0244 |
| 9,982,085 B2 | 5/2018 | Landers et al. |
| 10,995,174 B2 | 5/2021 | Emmrich-Smolczyk et al. |
| 2006/0167125 A1 | 7/2006 | Bauer et al. |
| 2007/0072951 A1 | 3/2007 | Bender et al. |
| 2007/0238800 A1 | 10/2007 | Neal et al. |
| 2007/0270518 A1 | 11/2007 | Nutzel |
| 2007/0282026 A1 | 12/2007 | Grigsby et al. |
| 2008/0234402 A1 | 9/2008 | Lehmann et al. |
| 2008/0277360 A1 * | 11/2008 | Ecker ........................ A47F 7/30 |
| | | 119/28.5 |
| 2009/0088489 A1 | 4/2009 | Terheiden et al. |
| 2012/0190762 A1 | 7/2012 | Hubel et al. |

(Continued)

FOREIGN PATENT DOCUMENTS

| | | |
|---|---|---|
| DE | 2 533 074 A1 | 3/1976 |
| DE | 4 229 402 A1 | 3/1994 |

(Continued)

OTHER PUBLICATIONS

Modro et al., U.S. Appl. No. 17/367,456, filed Jul. 5, 2021.
Herrmann et al., U.S. Appl. No. 17/448,240, filed Sep. 21, 2021.
European Search Report mailed on Nov. 30, 2020 in EP 20185424.7 (10 pages).
Herrmann et al., U.S. Appl. No. 15/930,595, filed May 13, 2020.
Third Party Observation for EP20200185424 (3 pages).

(Continued)

*Primary Examiner* — Melissa A Rioja

(74) *Attorney, Agent, or Firm* — Grüneberg and Myers PLLC

(57) ABSTRACT

Shaped PU foam articles, preferably mattresses and/or cushions, wherein the polyurethane foam has been obtained by reaction of at least one polyol component and at least one isocyanate component in the presence of at least one compound of formula (1a) and at least one compound of formula (1b) and at least one blowing agent, are described.

17 Claims, No Drawings

(56) References Cited

U.S. PATENT DOCUMENTS

| | | | |
|---|---|---|---|
| 2014/0309324 A1* | 10/2014 | Macken | C08J 9/00 521/174 |
| 2015/0031781 A1 | 1/2015 | Landers et al. | |
| 2016/0075817 A1 | 3/2016 | Burdeniuc et al. | |
| 2016/0102169 A1 | 4/2016 | Burdeniuc | |
| 2017/0226264 A1 | 8/2017 | Günther et al. | |
| 2019/0092893 A1 | 3/2019 | Emmrich-Smolczyk et al. | |
| 2020/0377684 A1 | 12/2020 | Hermann et al. | |
| 2021/0137276 A1 | 5/2021 | Landers et al. | |
| 2021/0214488 A1 | 7/2021 | Emmrich-Smolczyk et al. | |
| 2021/0253780 A1 | 8/2021 | Wessely et al. | |

FOREIGN PATENT DOCUMENTS

| | | |
|---|---|---|
| DE | 4 239 054 A1 | 5/1994 |
| DE | 10 2004 001 408 A1 | 7/2005 |
| DE | 10 2007 046 860 A1 | 4/2009 |
| EP | 0 380 993 A2 | 8/1990 |
| EP | 0 493 836 A1 | 7/1992 |
| EP | 0 533 202 A1 | 3/1993 |
| EP | 0 780 414 A2 | 6/1997 |
| EP | 0 839 852 A2 | 5/1998 |
| EP | 0 656 382 B1 | 8/1998 |
| EP | 0 867 465 A1 | 9/1998 |
| EP | 1 161 474 A1 | 12/2001 |
| EP | 1 537 159 A1 | 6/2005 |
| EP | 1 544 235 A1 | 6/2005 |
| EP | 1 678 232 A2 | 7/2006 |
| EP | 1 712 578 A1 | 10/2006 |
| EP | 1 977 825 A1 | 10/2008 |
| EP | 1 985 642 A1 | 10/2008 |
| EP | 1 985 644 A1 | 10/2008 |
| EP | 1 777 252 B1 | 12/2009 |
| EP | 2 182 020 | 5/2010 |
| EP | 2 481 770 | 8/2012 |
| EP | 3 205 680 | 8/2017 |
| EP | 3 459 983 A1 | 3/2019 |
| WO | 96/12759 A2 | 5/1996 |
| WO | 00/47647 A1 | 8/2000 |
| WO | 00/58383 A1 | 10/2000 |
| WO | 2004/020497 A1 | 3/2004 |
| WO | 2005/033167 A2 | 4/2005 |
| WO | 2005/085310 A2 | 9/2005 |
| WO | 2005/118668 A1 | 12/2005 |
| WO | 2007/111828 A2 | 10/2007 |
| WO | 2013/131710 A2 | 9/2013 |
| WO | 2019/046892 A1 | 3/2019 |
| WO | 2019/094157 A1 | 5/2019 |

OTHER PUBLICATIONS

Kunststoffhandbuch [Plastics Handbook], vol. 7, Polyurethane [Polyurethanes], Carl-Hanser-Verlag Munich, 1$^{st}$ edition 1966, 2nd edition 1983 and 3rd edition 1993, 13 pages.

* cited by examiner

SHAPED PU FOAM ARTICLES

CROSS REFERENCE TO RELATED APPLICATIONS

This application is a 35 U.S.C. § 119 patent application which claims the benefit of U.S. Provisional Application No. 62/876,062 filed Jul. 19, 2019, which is incorporated herein by reference in its entirety.

FIELD

The present invention is in the field of PU foams. It especially relates to the provision of shaped PU foam articles, for example mattresses and/or cushions.

BACKGROUND

Shaped PU foam articles, for example polyurethane foam-containing mattresses and/or cushions, have long been known from the prior art and are employed worldwide. There has been no shortage of attempts to achieve ever greater improvements. The need for optimization has not been fully satisfied to the present day.

SUMMARY

One problem with regard to shaped PU foam articles is the transport and storage thereof. Shaped PU foam articles, for example mattresses, are very bulky and are therefore often compressed, especially compressed and vacuum-packed, for storage and transport due to space considerations. Large distributors are increasingly shipping certain mattresses in compressed and rolled-up form.

Such packagings are widely used for mattresses in particular. In vacuum packaging the mattress is placed in a bag made of plastic film for example. The thus prepackaged mattress is then placed in a press and compressed with one end of the bag open. The air escapes. The open end of the bag is then welded shut in an airtight manner. The thus obtained vacuum packaging is then rolled up and placed inside an outer bag. The mattress cannot re-expand since the outer bag keeps it in rolled-up form.

Flattening a mattress to the extent achieved by a machine during rolling for example requires a force between 40,000 and 250,000 N depending on the mattress. This corresponds to the weight force exerted by a mass of 4 to 25 tons.

As is immediately apparent, such a force in connection with the compression of shaped PU foam articles may result in material fatigue. It is a very relevant problem to provide shaped PU foam articles which even after extended compression are capable of recovering their original dimensions.

DETAILED DESCRIPTION

Against this backdrop the present invention specifically has for its object to provide shaped PU foam articles such as in particular polyurethane foam-containing mattresses and/or cushions that are well-suited to recover their original shape after compression over a period of at least 20 hours.

In the context of the present invention it has now been found that, surprisingly, this object can be achieved by the subject matter of the invention.

The present invention provides a shaped PU foam article, preferably a mattress and/or cushion, characterized in that the polyurethane foam has been obtained by reaction of at least one polyol component and at least one isocyanate component in the presence of at least one compound of formula (1a) and at least one compound of formula (1b) and at least one blowing agent, wherein formulae (1a) and (1b) are defined as follows:

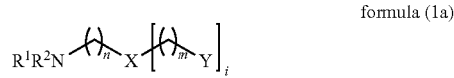

formula (1a)

wherein in formula (1a):
X represents oxygen, nitrogen or amine ($NR^3$ or $NR^3R^4$), in particular oxygen,
Y represents amine $NR^8R^9$ or ether $OR^9$, in particular amine $NR^8R^9$, where $R^8$=methyl and $R^9$=aminopropyl,
$R^{1,2}$ represent identical or different hydrocarbon radicals having 1-8 carbon atoms, phenyl, cyclohexyl or hydrogen, preferably methyl, ethyl, iso-propyl or hydrogen, particularly preferably methyl or hydrogen, in particular methyl,
$R^{3-9}$ represent identical or different hydrocarbon radicals having 1-8 carbon atoms which optionally bear an NH or $NH_2$ group, phenyl, cyclohexyl or hydrogen, preferably methyl, ethyl, iso-propyl, aminoalkyl or hydrogen, particularly preferably methyl, aminopropyl or hydrogen, in particular methyl or aminopropyl,
m=1 to 4, preferably 2 and 3, in particular 2,
n=2,
i=0 to 3, preferably 0, 1 and 2, in particular 1,
with the proviso that at least one of the groups X, Y or $R^{1-9}$ bears a functionality reactive with the polyurethane matrix, preferably an isocyanate-reactive functionality, especially preferably NH or OH,

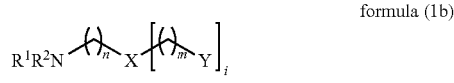

formula (1b)

wherein in formula (1b):
X represents oxygen, nitrogen, hydroxyl, amines ($NR^3$ or $NR^3R^4$) or urea ($N(R^5)C(O)N(R^6)$ or $N(R^5)C(O)NR^6R^7$), in particular urea ($N(R^5)C(O)N(R^6)$ or $N(R^5)C(O)NR^6R^7$) or nitrogen,
Y represents amine ($NR^8R^9$) or ether ($OR^9$), in particular amine ($NR^8R^9$), where $R^8$ and $R^9$=methyl,
$R^{1,2}$ represent identical or different hydrocarbon radicals having 1-8 carbon atoms optionally bearing an OH group, phenyl, cyclohexyl or hydrogen, preferably methyl, ethyl, iso-propyl, —$C_2H_3(OH)CH_3$, —$C_2H_4OH$ or hydrogen, particularly preferably methyl, —$C_2H_3(OH)CH_3$, —$C_2H_4OH$ or hydrogen, in particular methyl or hydrogen,
$R^{3-9}$ represent identical or different hydrocarbon radicals having 1-8 carbon atoms optionally bearing an OH or an $NH/NH_2$ group, phenyl, cyclohexyl or hydrogen, preferably methyl, ethyl, iso-propyl, —$C_2H_3(OH)CH_3$, —$C_2H_4OH$, aminoalkyl or hydrogen, particularly preferably methyl, —$C_2H_3(OH)CH_3$, —$C_2H_4OH$, aminopropyl or hydrogen, in particular hydrogen or methyl,
m=1 to 4, preferably 2 and 3, in particular 3,
n=3,
i=0 to 3, preferably 0, 1 and 2, in particular 1 or 2,
with the proviso that at least one of the groups X, Y or $R^{1-9}$ bears a functionality reactive with the polyurethane matrix, preferably an isocyanate-reactive functionality, especially preferably NH or OH.

It will be appreciated that further customary additives, active substances and auxiliaries may optionally also be advantageously employed. Mattresses are very particularly preferred in the context of the present invention. This advantageously also applies to all of the following preferred embodiments.

The shaped PU foam article thus provided using the compounds of formulae (1a) and (1b) is therefore well-suited to recovering its original shape even after extended compression over a period of at least 20 hours.

A further advantage is that the relevant shaped PU foam articles have particularly low emissions with respect to amine emissions.

In the context of the present invention "low-emission" with respect to amines is to be understood as meaning in particular that the flexible polyurethane foam for producing mattresses and/or cushions, preferably for producing mattresses, has an amine emission of $\geq 0$ µg/m³ to $\leq 40$ µg/m³, preferably $\leq 10$ µg/m³, particularly preferably $\leq 5$ µg/m³, appropriately determined by the test chamber method based on DIN standard DIN EN ISO 16000-9:2008-04, 24 hours after test chamber loading. This method is described precisely in EP 3205680A1, specifically in paragraph [0070], which is hereby incorporated by reference.

A further advantage is that the relevant shaped PU foam articles can also meet emissions specifications such as CertiPur and/or VDA 278. "Low-emission" according to CertiPur is to be understood as meaning that the total emissions of volatile organic substances amount to less than 500 µg/m³, determined according to the method ISO 16000-9 and ISO 16000-11. "Low-emission" according to VDA 278 is to be understood as meaning that the PU foams meet the specifications of the method Daimler Chrysler PB VWL 709. The VDA 278 specification is also described in the examples.

PU foams (polyurethane foams) and the production thereof are well known to those skilled in the art and, per se, require no further elucidation. Shaped articles are shaped bodies of different shapes. Preferred shapes are for example geometries such as spheres, cuboids, cylinders etc. Shaped PU foam articles are thus shaped bodies made of polyurethane foam. Particularly preferred shaped PU foam articles in the context of the present invention are mattresses and/or cushions and also foam blocks in general.

Mattresses per se and the production thereof are known. They usually consist of a mattress core, e.g. comprising foam, latex, natural products and/or a spring core, and a cover surrounding the mattress. A corresponding situation applies to cushions. In the context of the present application the term mattress and/or cushion is to be understood as meaning that at least one section made of polyurethane foam is present in the mattress and/or the cushion. It is preferably to be understood as meaning that at least a portion of the mattress and/or of the cushion consists of polyurethane foam or of different polyurethane foams. Based on the total weight of the mattress and/or of the cushion, this part can account for at least 1% by weight or 5% by weight or 25% by weight, preferably at least 50% by weight, in particular at least 75% by weight. It is also possible for the mattress and/or the cushion to consist entirely of polyurethane foam, apart from the cover.

The production of polyurethane foam is known per se. It is formed by the tried and tested reaction of at least one polyol component and at least one isocyanate component in the presence of at least one blowing agent (e.g. water) in a polyaddition reaction. It is essential to the present invention that this reaction is carried out in the presence of at least one compound of formula (1a) and at least one compound of formula (1b) as defined hereinabove in each case.

In a preferred embodiment of the invention, the polyurethane foam according to the invention is a flexible polyurethane foam, such as preferably a hot-cured flexible polyurethane foam, a cold-cured flexible polyurethane foam or a viscoelastic flexible polyurethane foam, or a combination of these flexible foams is used, for example two or three of these flexible foams. The differentiation between the above-mentioned flexible foam types is known per se to those skilled in the art; these are well-known technical terms which have become correspondingly established in the field, but will nevertheless be explained briefly here.

In cold-cured flexible foam production the crucial difference from hot-cured flexible foam is that highly reactive polyols and optionally also low molecular weight crosslinkers are employed, wherein the function of the crosslinker may also be assumed by higher-functional isocyanates. Reaction of the isocyanate groups with the hydroxyl groups thus occurs as early as in the expansion phase ($CO_2$ formation from —NCO and $H_2O$) of the foam. This rapid polyurethane reaction usually leads, as a result of a viscosity increase, to a relatively high intrinsic stability of the foam during the blowing process. Cold-cured flexible polyurethane foams are usually highly elastic foams in which edge zone stabilization plays an important role. Due to the high intrinsic stability the cells have generally not been opened sufficiently at the end of the foaming operation and additional mechanical crushing is required. The necessary crushing force ("force to crush" (FTC)) gives an indication of the open-cell content. Foams having a high open-cell content and requiring only low crushing forces are generally desirable. In mould foaming, cold-cured flexible polyurethane foams are, in contrast to hot-cured flexible polyurethane foams, produced at a lower temperature, for example of $\leq 90°$ C.

Open-cell flexible polyurethane foams usually have a gas permeability (also referred to as "porosity") in a range from 1 to 250 mm water column, in particular in a range from 1 to 50 mm water column (preferably determined by measuring the pressure difference upon traversal of a foam specimen). To this end, for example, a 5 cm thick foam disc is placed on a smooth base. A plate having a weight of 800 g (10 cm×10 cm) and a central bore (diameter 2 cm) and a hose connection is placed on the foam plate. An air stream of 8 l/min is passed into the foam specimen through the central bore. The more closed the foam the more pressure is built up, the more the level of the water column is forced downward and the greater the values that are measured.

Depending on application hot-cured flexible foams generally have a foam density between 8 and 80 kg/m³. Cold-cured flexible foams, especially for production of high-quality mattresses, are typically produced in a density range of 25-80 kg/m³. Especially when using such foams as mattresses, mattress constituents and/or cushions, said foams are differentiated according to regional wants and needs, requirements and preferences of consumers.

A key feature of cold-cured flexible foams is their higher rebound resilience (also known as "ball rebound" (BR) or "resilience"). A method of determining the rebound resilience is described, for example, in DIN EN ISO 8307:2008-03. Here, a steel ball having a fixed mass is allowed to fall from a particular height onto the test specimen and the height of the rebound in % of the drop height is then measured. Typical values for a cold-cured flexible foam are usually in the range of ≥55%. Cold-cured flexible foams are thus also often referred to as HR foams (HR: High Resilience). By contrast, hot-cured flexible polyurethane foams have rebound values of typically 15% to not more than 60%.

A specific class of polyurethane foams is that of viscoelastic foams. These are also known as "memory foam" and exhibit both a low rebound resilience (preferably <10%) and also a slow, gradual recovery after compression (recovery time preferably 2-10 s). Materials of this kind are well known in the prior art and are highly valued for, in particular, their energy- and sound-absorbing properties too. Typical viscoelastic foams usually have a lower porosity and a high density (or a high foam density (FD)) compared to conventional flexible polyurethane foams. Cushions have a foam density of usually 30-50 kg/m$^3$ and are thus at the lower end of the density scale typical of viscoelastic foams, whereas mattresses usually have a density in the range of 40-130 kg/m$^3$.

In conventional polyurethane foams, the hard and soft (low glass transition temperature) phases become arranged next to one another during the polymerization and then spontaneously separate from one another to form morphologically different phases within the "bulk polymer". Such materials are also referred to as "phase-separated" materials. In this context, viscoelastic polyurethane foams are a special case where the above-described phase separation occurs only incompletely, if at all. The glass transition temperature in the case of viscoelastic foams is preferably in the range from −20 to +15° C., while the glass transition temperature of hot-cured flexible polyurethane foams and cold-cured flexible polyurethane foams is in contrast usually below −35° C. Such "structural viscoelasticity" which is based mainly on the glass transition temperature of the polymer should be distinguished from viscoelasticity of polyurethane foams having (predominantly) open cells, which is attributable to a pneumatic effect. This is because, in the latter case, virtually closed cells, i.e. cells having only a small opening, are present in the foam material. As a result of the small size of the openings, the air flows back in only gradually after compression, which results in slowed recovery.

Various flexible polyurethane foams are classified not only according to the foam density but often also according to their compressive strength, also referred to as load-bearing capacity, for particular applications. Thus, the compressive strength CLD (compression load deflection), 40% in accordance with DIN EN ISO 3386-1:2015-10, of hot-cured flexible polyurethane foams is usually in the range of 2.0-8.0 kPa. Cold-cured flexible foams generally have values of from 2.0 to 5.0 kPa, in particular from 2.5 to 4.5 kPa, while viscoelastic polyurethane foams usually have values of 0.1-5.0 kPa, in particular 0.5-3.0 kPa.

In a preferred embodiment of the invention, the polyurethane foams, in particular flexible polyurethane foams, to be employed according to the invention have the following preferred properties in respect of rebound resilience, foam density and/or porosity (optionally after crushing the foams, particularly in the case of cold-cured flexible polyurethane foam), namely a rebound resilience of 1% to 80%, measured in accordance with DIN EN ISO 8307:2008-03, and/or a foam density of 5 to 150 kg/m$^3$ and/or a porosity of 1 to 250, in particular 1 to 50, mm water column. Particular preference is given to all 3 criteria in respect of rebound resilience, foam density and/or porosity, as indicated above, being satisfied. In particular, the flexible polyurethane foam used according to the invention has a compressive strength CLD, 40% in accordance with DIN EN ISO 3386-1:2015-10, of 0.1 to 8.0 kPa.

Hot-cured flexible polyurethane foam, cold-cured flexible polyurethane foam and viscoelastic flexible polyurethane foam and the production thereof are known per se. For the purposes of the present invention, hot-cured flexible polyurethane foam has, in particular, a compressive strength CLD, 40% in accordance with DIN EN ISO 3386-1:2015-10, of 2.0-8.0 kPa and/or a rebound resilience of 15-60%, measured in accordance with DIN EN ISO 8307:2008-03, and/or a foam density of 8 to 80 kg/m$^3$ and/or a porosity of 1 to 250, in particular 1 to 50, mm, water column. A possible production method is described, for example, in EP 2 481 770 A2 or EP 2 182 020 A1. For the purposes of the present invention, cold-cured flexible polyurethane foam has, in particular, a compressive strength CLD, 40% in accordance with DIN EN ISO 3386-1:2015-10, of 2.0-5.0 kPa, in particular 2.5-4.5 kPa, and/or a rebound resilience of ≥55%, measured in accordance with DIN EN ISO 8307:2008-03, and/or a foam density of 25 to 80 kg/m$^3$ and/or a porosity (after crushing the foam) of 1 to 250, in particular 1 to 50, mm water column. A possible method of production is described, for example, in EP 1777252 B1. For the purposes of the present invention, viscoelastic flexible polyurethane foam has, in particular, a glass transition temperature between −20° C. and +15° C. and/or a compressive strength CLD, 40% in accordance with DIN EN ISO 3386-1:2015-10, of 0.1-5.0 kPa, in particular 0.5-3.0 kPa, and/or a rebound resilience of <10%, measured in accordance with DIN EN ISO 8307:2008-03, and/or a foam density of 30 to 130 kg/m$^3$ and/or a porosity (after crushing the foam) of 1 to 250, in particular 1 to 50, mm water column. A possible method of production is described, for example, in WO 2013/131710 A2. The glass transition temperature can be measured by means of dynamic mechanical analysis (DMA) (DIN 53513:1990-03) or by means of differential calorimetry (DSC) (ISO 11357-2:2013). Strictly speaking, it is a glass transition range which extends over a temperature range. The reported glass transition temperatures are average values.

The shaped PU foam article of the invention, in particular the mattress of the invention, has, in a preferred embodiment of the invention, a height of from at least 1 cm to not more than 50 cm and a width of from at least 20 cm to not more than 300 cm and a length of from at least 20 cm to not more than 300 cm. Preferred dimensions are, for example, heights in the range from 5 cm to 40 cm, widths in the range from 70 cm to 200 cm, lengths in the range from 150 cm to 220 cm. The shaped PU foam article of the invention, in particular the cushion of the invention, can also have, in a preferred embodiment of the invention, a height of from at least 1 cm to not more than 40 cm and a width of from at least 15 cm to not more than 200 cm and a length of from at least 15 cm to not more than 200 cm, wherein preferred dimensions are, for example, heights in the range from 2 cm to 30 cm, widths in the range from 15 cm to 50 cm, lengths in the range from 15 cm to 50 cm.

In a further preferred embodiment of the invention, the shaped PU foam article is a mattress and is preferably in the form of a multizone mattress. The different zones differ in terms of, in particular, the respective hardness. Such multizone mattresses and the production thereof are known per se. They are widely sold commercially. In particular, the mattress has up to seven zones of differing hardness which extend over the longitudinal direction of the mattress and are given the appropriate width. When the mattress has various hardness zones distributed over its area, which are formed, in particular, by cuts and/or hollow spaces in the mattress, this constitutes a further preferred embodiment of the invention.

In a further preferred embodiment of the invention, the shaped PU foam article may be a cold-cured polyurethane foam mattress, a viscoelastic flexible polyurethane foam mattress, a hot-cured polyurethane foam mattress, a polyurethane gel-foam mattress, a latex mattress or a box-spring mattress. These types of mattress are known per se to those skilled in the art and are also marketed worldwide under these names. Hot-cured foam mattresses are usually referred to on the market as foam mattresses in the interests of simplicity. The term mattress as used for the purposes of the present invention also encompasses corresponding mattress coverings and underlays.

In a preferred embodiment of the invention, the shaped PU foam article, preferably the mattress, has the feature that based on its starting volume the shaped PU foam article is compressed by at least 20%, preferably at least 30%, in particular at least 60%, and kept in compressed form by an auxiliary means, in particular packaging means, for at least 20 hours.

Suitable auxiliary means, in particular packaging means, are bags and/or films such as are known from the field of rollup mattresses for example. The bags and/or films may be sealed by any desired means, such as by a clip, or by an adhesive tape or by welding. The function of the auxiliary means is that of maintaining the compressed shape until the end user of the shaped PU foam article wishes to use said shaped article again in the normal way. After removal of the auxiliary means, in particular the packaging means, the compressed shaped article expands again and in the optimal case recovers its original shape and size. The present invention makes it possible to allow improved dimensional recovery after compression over a period of at least 20 hours.

In a further preferred embodiment, the shaped PU foam article is in a compressed and vacuum-packed state and in particular is a rollup mattress in a vacuum-packed and compressed state.

The provision of the various PU foams which can be used in the context of the present invention is known per se and it is possible to make recourse to all proven processes with the proviso that the PU foam is produced in the presence of at least one compound of formula (1a) and at least one compound of formula (1b).

The production of corresponding PU foams in principle requires no further explanation, but some preferred details of the production of the PU foam used for the purposes of the invention are given below. The subject-matter of the invention will be described by way of example below, without any intention that the invention be restricted to these illustrative embodiments. Where ranges, general formulae or classes of compounds are specified below, these are intended to encompass not only the corresponding ranges or groups of compounds which are explicitly mentioned but also all subranges and subgroups of compounds which can be obtained by removing individual values (ranges) or compounds. Where documents are cited in the context of the present description, the entire content thereof, particularly with regard to the subject matter that forms the context in which the document has been cited, is intended to form part of the disclosure content of the present invention. Unless stated otherwise, percentages are figures in percent by weight. When average values are reported below, the values in question are weight averages, unless stated otherwise. Where parameters which have been determined by measurement are reported below, the measurements have been carried out at a temperature of 25° C. and a pressure of 101 325 Pa, unless stated otherwise. Unless stated otherwise compression of the foam in the context of the present invention means that the foam is preferably compressed by at least 20%, preferably at least 30%, in particular at least 60%, based on its starting volume, in particular over a period of at least 20 hours.

For the purposes of the present invention, polyurethanes are all reaction products derived from isocyanates, in particular polyisocyanates, and appropriately isocyanate-reactive molecules. These include polyisocyanurates, polyureas, and allophanate-, biuret-, uretdione-, uretonimine- or carbodiimide-containing isocyanate or polyisocyanate reaction products. It goes without saying that a person skilled in the art seeking to produce the various flexible polyurethane foams, for example hot-cured, cold-cured or viscoelastic flexible polyurethane foams, can appropriately select the substances which are necessary for the purpose in each case, for example isocyanates, polyols, stabilizers, surfactants, etc., in order to obtain the respectively desired type of polyurethane, in particular type of polyurethane foam. Further details of the starting materials, catalysts and auxiliaries and additives used can be found, for example, in Kunststoffhandbuch [Plastics Handbook], volume 7, Polyurethane [Polyurethanes], Carl-Hanser-Verlag Munich, 1st edition 1966, 2nd edition 1983 and 3rd edition 1993. The compounds, components and additives which follow are mentioned merely by way of example and can be replaced and/or supplemented by other substances known to those skilled in the art.

The isocyanate components used are preferably one or more organic polyisocyanates having two or more isocyanate functions. Polyol components used are preferably one or more polyols having two or more isocyanate-reactive groups.

Isocyanates suitable as isocyanate components for the purposes of this invention are all isocyanates containing at least two isocyanate groups. All aliphatic, cycloaliphatic, arylaliphatic and preferably aromatic polyfunctional isocyanates known per se may generally be used. Isocyanates are preferably used in a range from 60 to 350 mol %, more preferably in a range from 60 to 140 mol %, relative to the sum total of the isocyanate-consuming components.

Specific examples are alkylene diisocyanates having 4 to 12 carbon atoms in the alkylene radical, e.g. dodecane 1,12-diisocyanate, 2-ethyltetramethylene 1,4-diisocyanate, 2-methylpentamethylene 1,5-diisocyanate, tetramethylene 1,4-diisocyanate and preferably hexamethylene 1,6-diisocyanate (HMDI), cycloaliphatic diisocyanates such as cyclohexane 1,3- and 1,4-diisocyanate and also any mixtures of these isomers, 1-isocyanato-3,3,5-trimethyl-5-isocyanatomethylcyclohexane (isophorone diisocyanate or IPDI for short), hexahydrotolylene 2,4- and 2,6-diisocyanate and also the corresponding isomer mixtures, and preferably aromatic diisocyanates and polyisocyanates, for example tolylene 2,4- and 2,6-diisocyanate (TDI) and the corresponding isomer mixtures, mixtures of diphenylmethane 2,4'- and 2,2'-diisocyanates (MDI) and polyphenylpolymethylene polyisocyanates (crude MDI) and mixtures of crude MDI and tolylene diisocyanates (TDI). The organic diisocyanates and polyisocyanates can be used individually or in the form of mixtures thereof.

It is also possible to use isocyanates which have been modified by the incorporation of urethane, uretdione, isocyanurate, allophanate and other groups, called modified isocyanates.

Particularly suitable organic polyisocyanates, which are therefore particularly preferably employed, are various isomers of tolylene diisocyanate (tolylene 2,4- and 2,6-diisocyanate (TDI), in pure form or as isomer mixtures of different compositions), diphenylmethane 4,4'-diisocyanate (MDI), known as "crude MDI" or "polymeric MDI" (contains not only the 4,4' isomer but also the 2,4' and 2,2' isomers of MDI and products having more than two rings) and also the two-ring product referred to as "pure MDI" which is composed predominantly of 2,4'- and 4,4' isomer mixtures and/or prepolymers thereof. Examples of particularly suitable isocyanates are detailed, for example, in EP 1712578, EP 1161474, WO 00/58383, US 2007/0072951, EP 1678232 and WO 2005/085310, which are hereby fully incorporated by reference.

Polyols suitable as polyol component for the purposes of the present invention are all organic substances having two or more isocyanate-reactive groups, preferably OH groups, and also formulations thereof. Preferred polyols are all polyether polyols and/or polyester polyols and/or hydroxyl-containing aliphatic polycarbonates which are customarily used for producing polyurethane systems, in particular polyurethane foams, in particular polyether polycarbonate polyols and/or filled polyols (polymer polyols) such as SAN, PHD and PIPA polyols which contain solid organic fillers up to a solids content of 40% or more in dispersed form, and/or autocatalytic polyols which contain catalytically active functional groups, in particular amino groups, and/or polyols of natural origin, known as "natural oil-based polyols" (NOPs). The polyols usually have a functionality of from 1.8 to 8 and number-average molecular weights in the range from 500 to 15 000 g/mol. The polyols having OH numbers in the range from 10 to 1200 mg KOH/g are usually employed. The number-average molecular weights are typically determined by gel permeation chromatography (GPC), especially using polypropylene glycol as reference substance and tetrahydrofuran (THF) as eluent. The OH numbers can be determined, in particular, in accordance with the DIN standard DIN 53240:1971-12. Depending on the required properties of the resulting foams, it is possible to use appropriate polyols, as described for example in: US 2007/0072951 A1, WO 2007/111828, US 2007/0238800, U.S. Pat. No. 6,359,022 or WO 96/12759. Further polyols are known to those skilled in the art and can be found, for example, in EP-A-0380993 or U.S. Pat. No. 3,346,557.

One preferred embodiment of the invention, in particular for production of moulded and highly elastic flexible foams, utilizes di- and/or trifunctional polyether alcohols comprising primary hydroxyl groups in amounts of preferably above 50%, more preferably above 80%, in particular those having an ethylene oxide block at the chain end. According to the required properties of this embodiment which is preferred in accordance with the invention, especially for production of the abovementioned foams, preference is given to using not only the polyether alcohols described here but also further polyether alcohols which bear primary hydroxyl groups and are based predominantly on ethylene oxide, in particular having a proportion of ethylene oxide blocks of >70%, preferably >90%. All polyether alcohols described in the context of this preferred embodiment preferably have a functionality of from 2 to 8, particularly preferably from 2 to 5, number-average molecular weights in the range from 2500 to 15 000 g/mol, preferably from 4500 to 12 000 g/mol, and usually OH numbers in the range from 5 to 80, preferably from 20 to 50 mg KOH/g.

A further preferred embodiment of the invention, in particular for production of flexible slabstock foams, utilizes di- and/or trifunctional polyether alcohols comprising secondary hydroxyl groups in amounts of preferably above 50%, more preferably above 90%, in particular those having a propylene oxide block or random propylene oxide and ethylene oxide block at the chain end, or those based exclusively on propylene oxide blocks. Such polyether alcohols preferably have a functionality of from 2 to 8, particularly preferably from 2 to 4, number-average molecular weights in the range from 500 to 8000 g/mol, preferably from 800 to 5000 g/mol, particularly preferably from 2500 to 4500 g/mol, and usually OH numbers in the range from 10 to 100, preferably from 20 to 60, mg KOH/g.

In a further preferred embodiment of the invention, particularly for producing moulded and highly elastic flexible foams, autocatalytic polyols are used.

In a further preferred embodiment of the invention, especially for production of viscoelastic polyurethane foams, preference is given to using mixtures of various, preferably two or three, polyfunctional polyester alcohols and/or polyether alcohols. The polyol combinations used here usually consist of a low molecular weight "crosslinker" polymer having a high functionality, preferably having an OH number of from 100 to 270 mg KOH/g, and/or a conventional high molecular weight flexible slabstock foam polyol or HR polyol and/or a "Hypersoft" polyether polyol, preferably having an OH number of from 20 to 40 mg KOH/g, with a high proportion of ethylene oxide and having cell-opening properties.

A preferred ratio of isocyanate and polyol, expressed as the index of the formulation, i.e. as stoichiometric ratio of isocyanate groups to isocyanate-reactive groups (e.g. OH groups, NH groups) multiplied by 100, is in the range from 10 to 1000, preferably 40 to 350, more preferably 70 to 140. An index of 100 represents a molar reactive group ratio of 1:1.

Depending on the application it may be preferable according to the invention to employ not only the inventive compounds of formulae (1a) and (1b) but also additional catalysts.

The expression "additional catalysts" encompasses, for the purposes of the present invention, all compounds known from the prior art which are able to catalyze isocyanate reactions and/or are used as catalysts, cocatalysts or activators in the production of polyisocyanate reaction products, in particular polyurethane foams.

Suitable additional catalysts for the purposes of the present invention include, for example, substances that catalyse one of the abovementioned reactions, in particular the gelling reaction (isocyanate with polyol), the blowing reaction (isocyanate with water) and/or the dimerization or trimerization of the isocyanate. Such catalysts are preferably nitrogen-containing compounds, especially amines and ammonium salts, and/or metal compounds.

Examples of suitable additional nitrogen-containing compounds as catalysts for the purposes of the present invention are the amines triethylamine, N,N-dimethylcyclohexylamine, N,N-dicyclohexylmethylamine, N,N,N',N'-tetramethylethylene-1,2-diamine, N,N,N',N'-tetramethylpropylene-1,3-diamine, N,N,N',N'-tetramethyl-1,4-butanediamine, N,N,N',N'-tetramethyl-1,6-hexanediamine, N,N,N',N'',N''-pentamethyldiethylenetriamine, 1-(2-aminoethyl)pyrrolidine, 1-(3-aminopropyl)pyrrolidine, N,N,N',N'',N''-pentamethyldipropylenetriamine, N,N-bis[3-(dimethylamino)propyl]-N',N'-dimethylpropane-1,3-diamine, triethylenediamine, 1,4-diazabicyclo[2.2.2]octane-2-methanol, 1,2-dimethylimidazole, N-(2-hydroxypropyl)imidazole, 1-isobutyl-2-methylimidazole, N-(3- aminopropyl)imidazole, N-methylimidazole, N-ethylmorpholine, N-methylmorpholine, 2,2,4-trimethyl-2-silamorpholine, N-ethyl-2,2-dimethyl-2-silamorpholine, N-(2-aminoethyl)morpholine, N-(2-hydroxyethyl)morpholine, 2,2'-di-morpholinodiethyl ether, N,N'-dimethylpiperazine, N-(2-hydroxyethyl)piperazine, N-(2-aminoethyl)piperazine, N,N-dimethylbenzylamine, 1-(2-hydroxyethyl)pyrrolidine, 1-(3-hydroxypropyl)pyrrolidine, bis(2-dimethylaminoethyl ether), tris(dimethylaminopropyl)hexahydro-1,3,5-triazine, 1,8-diazabicyclo[5.4.0]undec-7-ene, 1,5-diazabicyclo[4.3.0]non-5-ene, 1,5,7-triazabicyclo[4.4.0]dec-5-ene, N-methyl-1,5,7-triazabicyclo[4.4.0]dec-5-ene, 1,4,6-triazabicyclo[3.3.0]oct-4-ene, 1,1,3,3-tetramethylguanidine, tert-butyl-1,1,3,3-tetramethylguanidine, guanidine, bis-N,N-(dimethylaminoethoxyethyl)isophorone dicarbamate, 3-dimethylamino-N,N-dimethylpropionamide and 2,4,6-tris(dimethylaminomethyl)phenol. Suitable additional nitrogen-containing catalysts known from the prior art can be procured, for example, from Evonik under the trade name TEGOAMIN® and DABCO®.

Suitable metal-containing compounds as additional catalysts can, for example, be selected from the group consisting of metal-organic or organometallic compounds, metal-organic or organometallic salts, organic metal salts, inorganic metal salts and from the group consisting of charged or uncharged metal-containing coordination compounds, in particular metal chelate complexes. The expression "metal-organic or organometallic compounds" in the context of this invention especially encompasses the use of metal compounds having a direct carbon-metal bond, also referred to here as metal organyls (e.g. tin organyls) or organometallic compounds (e.g. organotin compounds). The expression "organometallic or metal-organic salts" in the context of this invention especially encompasses the use of metal-organic or organometallic compounds having salt character, i.e. ionic compounds in which either the anion or cation is metal-organic in nature (e.g. organotin oxides, organotin chlorides or organotin carboxylates). The expression "organic metal salts" in the context of this invention especially encompasses the use of metal compounds which do not have any direct carbon-metal bond and are simultaneously metal salts, in which either the anion or the cation is an organic compound (e.g. tin(II) carboxylates). The expression "inorganic metal salts" in the context of this invention especially encompasses the use of metal compounds or of metal salts in which neither the anion nor the cation is an organic compound, e.g. metal chlorides (e.g. tin(II) chloride), pure metal oxides (e.g. tin oxides) or mixed metal oxides, i.e. containing a plurality of metals, and/or metal silicates or aluminosilicates. The expression "coordination compound" in the context of this invention especially encompasses the use of metal compounds formed from one or more central particles and one or more ligands, the central particles being charged or uncharged metals (e.g. metal- or tin-amine complexes). For the purposes of the present invention, the expression "metal-chelate complexes" encompasses especially the use of metal-containing coordination compounds which have ligands having at least two coordination or bonding positions to the metal centre (e.g. metal- or tin-polyamine or metal- or tin-polyether complexes). Suitable metal compounds, especially as defined above, as additional catalysts for the purposes of the present invention may, for example, be selected from all metal compounds containing lithium, sodium, potassium, magnesium, calcium, scandium, yttrium, titanium, zirconium, vanadium, niobium, chromium, molybdenum, tungsten, manganese, cobalt, nickel, copper, zinc, mercury, aluminium, gallium, indium, germanium, tin, lead and/or bismuth, especially sodium, potassium, magnesium, calcium, titanium, zirconium, molybdenum, tungsten, zinc, aluminium, tin and/or bismuth, more preferably tin, bismuth, zinc and/or potassium.

Suitable metal-containing coordination compounds include, for example, any metal acetylacetonates such as nickel(II) acetylacetonate, zinc(II) acetylacetonate, copper (II) acetylacetonate, molybdenum dioxoacetylacetonate, any iron acetylacetonates, any cobalt acetylacetonates, any zirconium acetylacetonates, any titanium acetylacetonates, any bismuth acetylacetonates and any tin acetylacetonates. Particularly suitable metal-organic salts and organic metal salts, particularly as defined above, as additional catalysts for the purposes of the present invention, are, for example, organotin, tin, zinc, bismuth and potassium salts, especially corresponding metal carboxylates, alkoxides, thiolates and mercaptoacetates, for example dibutyltin diacetate, dimethyltin dilaurate, dibutyltin dilaurate (DBTDL), dioctyltin dilaurate (DOTDL), dimethyltin dineodecanoate, dibutyltin dineodecanoate, dioctyltin dineodecanoate, dibutyltin dioleate, dibutyltin bis-n-laurylmercaptide, dimethyltin bis-n-laurylmercaptide, monomethyltin tris-2-ethylhexylmercaptoacetate, dimethyltin bis-2-ethylhexylmercaptoacetate, dibutyltin bis-2-ethylhexylmercaptoacetate, dioctyltin bisisooctylmercaptoacetate, tin(II) acetate, tin(II) 2-ethylhexanoate (tin(II) octoate), tin(II) isononanoate (tin(II) 3,5,5-trimethylhexanoate), tin(II) neodecanoate, tin(II) ricinoleate, zinc(II) acetate, zinc(II) 2-ethylhexanoate (zinc(II) octoate), zinc(II) isononanoate (zinc(II) 3,5,5-trimethylhexanoate), zinc(II) neodecanoate, zinc(II) ricinoleate, bismuth acetate, bismuth 2-ethylhexanoate (bismuth octoate), bismuth isononanoate, bismuth neodecanoate, potassium formate, potassium acetate, potassium 2-ethylhexanoate (potassium octoate), potassium isononanoate, potassium neodecanoate and/or potassium ricinoleate. Suitable additional metallic catalysts are generally and preferably selected such that they do not have any troublesome intrinsic odor and are essentially toxicologically safe, and such that the resulting polyurethane systems, especially polyurethane foams, have a minimum level of catalyst-related emissions.

Apart from additional amines and metal compounds, it is also possible to use ammonium salts as additional catalysts. Suitable examples are ammonium formate and/or ammonium acetate.

Suitable additional catalysts are mentioned, for example, in DE 102007046860, EP 1985642, EP 1985644, EP 1977825, US 2008/0234402, EP 0656382 B1 and US 2007/0282026 A1, and the patent documents cited therein.

Suitable amounts of additional catalysts used are guided by the type of catalyst and are preferably in the range from 0.01 to 10.0 pphp, more preferably in the range from 0.02 to 5.00 pphp (=parts by weight based on 100 parts by weight of polyol) or 0.10 to 10.0 pphp for potassium salts.

The compounds of formulae (1a) and (1b) can, for example, be used together with suitable solvents and/or further additives. As optional solvents, it is possible to employ all suitable substances known from the prior art. Depending on the application, it is possible to use aprotic nonpolar, aprotic polar and protic solvents. Suitable aprotic nonpolar solvents can, for example, be selected from the following classes of substances, or classes of substances containing the following functional groups: aromatic hydrocarbons, aliphatic hydrocarbons (alkanes (paraffins) and olefins), carboxylic esters and polyesters, (poly)ethers and/or halogenated hydrocarbons having a low polarity. Suitable aprotic polar solvents can, for example, be selected from the following classes of substances, or classes of substances containing the following functional groups: ketones, lactones, lactams, nitriles, carboxamides, sulfoxides and/or sulfones. Suitable protic solvents can, for example, be selected from the following classes of substances, or classes of substances containing the following functional groups: alcohols, polyols, (poly)alkylene glycols, amines, carboxylic acids, in particular fatty acids and/or primary and secondary amides. Particular preference is given to solvents which are readily employable in the foaming operation and do not adversely affect the properties of the foam. For example, isocyanate-reactive compounds are suitable, since they are incorporated into the polymer matrix by reaction and do not generate any emissions in the foam. Examples are OH-functional compounds such as (poly)alkylene glycols, preferably monoethylene glycol (MEG or EG), diethylene glycol (DEG), triethylene glycol (TEG), 1,2-propylene glycol (PG), dipropylene glycol (DPG), trimethylene glycol (propane-1,3-diol, PDO), tetramethylene glycol (butanediol, BDO), butyl diglycol (BDG), neopentyl glycol, 2-methylpropane-1,3-diol (Ortegol CXT) and higher homologues thereof, for example polyethylene glycol (PEG) having mean molecular masses between 200 and 3000.

Particularly preferred OH-functional compounds further include polyethers having mean molecular masses of 200 to 4500, in particular 400 to 2000, among these preferably water-, methyl-, ethyl-, allyl-, butyl- or nonyl-initiated polyethers, in particular those which are based on propylene oxide (PO) and/or ethylene oxide (EO) blocks.

When the compounds of formulae (1a) and (1b) are used in dissolved form or in combination with a solvent, or premixed catalyst combinations of the compounds of formulae (1a) and (1b) with additional catalysts are used in dissolved form or in combination with a solvent, the mass ratio of the sum total of all catalysts to solvent is by preference from 100:1 to 1:10, preferably from 50:1 to 1:5 and more preferably from 25:1 to 1:4.

Employable optional additives include all substances which are known from the prior art and find use in the production of polyurethanes, especially of polyurethane foams, for example blowing agents, preferably water for formation of $CO_2$, and, if necessary, further physical blowing agents, crosslinkers and chain extenders, stabilizers against oxidative degradation (called antioxidants), flame retardants, surfactants, biocides, cell-refining additives, cell openers, solid fillers, antistatic additives, nucleating agents, thickeners, dyes, pigments, color pastes, fragrances, emulsifiers, buffer substances and/or additional catalytically active substances, especially as defined above.

Water is generally used as the blowing agent in the production of polyurethane foams. Preference is given to using such an amount of water that the water concentration is from 0.10 to 15.0 pphp (pphp=parts by weight based on 100 parts by weight of polyol).

It is also possible to use suitable physical blowing agents. These are, for example, liquefied $CO_2$ and volatile liquids, for example hydrocarbons having 3, 4 or 5 carbon atoms, preferably cyclopentane, isopentane and n-pentane, oxygen-containing compounds such as methyl formate, acetone and dimethoxymethane, or chlorinated hydrocarbons, preferably dichloromethane and 1,2-dichloroethane.

Apart from water and the physical blowing agents, it is also possible to use other chemical blowing agents which react with isocyanates to evolve a gas, for example formic acid.

Optional crosslinkers and optional chain extenders are low molecular weight, polyfunctional compounds which are reactive toward isocyanates. Suitable compounds are, for example, hydroxyl- or amine-terminated substances such as glycerol, neopentyl glycol, 2-methyl-1,3-propanediol, triethanolamine (TEOA), diethanolamine (DEOA) and trimethylolpropane. The use concentration is usually in the range from 0.1 to 5 parts, based on 100 parts of polyol, but can also deviate therefrom depending on the formulation. When crude MDI is used in in-situ foaming, it likewise assumes a crosslinking function. The content of low molecular weight crosslinkers can therefore be reduced correspondingly with an increasing amount of crude MDI.

Suitable optional stabilizers against oxidative degradation, so-called antioxidants, preferably include all commonly used free-radical scavengers, peroxide scavengers, UV absorbers, light stabilizers, complexing agents for metal ion contaminants (metal deactivators). Preference is given to using compounds of the following classes of substances, or classes of substances containing the following functional groups, with substituents on the respective parent molecules preferably being, in particular, substituents which have groups which are reactive toward isocyanate: 2-(2'-hydroxyphenyl)benzotriazoles, 2-hydroxybenzophenones, benzoic acids and benzoates, phenols, in particular comprising tert-butyl and/or methyl substituents on the aromatic entity, benzofuranones, diarylamines, triazines, 2,2,6,6-tetramethylpiperidines, hydroxylamines, alkyl and aryl phosphites, sulfides, zinc carboxylates, diketones.

Suitable optional flame retardants in the context of this invention are all substances which are regarded as suitable for this purpose according to the prior art. Preferred flame retardants are, for example, liquid organophosphorus compounds such as halogen-free organophosphates, e.g. triethyl phosphate (TEP), halogenated phosphates, for example tris (1-chloro-2-propyl) phosphate (TCPP) and tris(2-chloroethyl) phosphate (TCEP), and organic phosphonates, for example dimethyl methanephosphonate (DMMP), dimethyl propanephosphonate (DMPP), or solids such as ammonium polyphosphate (APP) and red phosphorus. Suitable flame retardants further include halogenated compounds, for example halogenated polyols, and also solids such as expandable graphite and melamine.

The foam properties of polyurethane foams can optionally be influenced in the course of production thereof using, in particular, siloxanes or organomodified siloxanes, for which it is possible to use the substances known in the prior art. Preference is given to using compounds which are particularly suitable for the respective foam types (rigid foams, hot-cured flexible foams, viscoelastic foams, ester foams, cold-cured flexible foams (HR foams), semirigid foams). Suitable (organomodified) siloxanes are described for example in the following documents: EP 0839852, EP 1544235, DE 102004001408, EP 0839852, WO 2005/118668, US 20070072951, DE 2533074, EP 1537159, EP 533202, U.S. Pat. No. 3,933,695, EP 0780414, DE 4239054, DE 4229402, EP 867465. These compounds may be produced as described in the prior art. Suitable examples are described, for instance, in U.S. Pat. No. 4,147,847, EP 0493836 and U.S. Pat. No. 4,855,379.

As optional (foam) stabilizers, it is possible to use all stabilizers known from the prior art. Preference is given to using foam stabilizers based on polydialkylsiloxane-polyoxyalkylene copolymers, as generally used in the production of urethane foams. The structure of these compounds is preferably such that, for example, a long-chain copolymer of ethylene oxide and propylene oxide is bonded to a polydimethylsiloxane radical. The linkage between the polydialkylsiloxane and the polyether moiety may be via an SiC linkage or an Si—O—C bond. In structural terms, the polyether or the different polyethers may be bonded to the polydialkylsiloxane in terminal or lateral positions. The alkyl radical or the various alkyl radicals can here be aliphatic, cycloaliphatic or aromatic. Methyl groups are very particularly advantageous. The polydialkylsiloxane may be linear or else contain branches. Suitable stabilizers, especially foam stabilizers, are described inter alia in U.S. Pat. Nos. 2,834,748, 2,917,480 and in U.S. Pat. No. 3,629,308. Suitable stabilizers can be purchased from Evonik Industries AG under the TEGOSTAB® trade name.

In the context of the present invention the siloxanes may also be used as part of compositions with different carrier media. Useful carrier media include, for example, glycols, for example monoethylene glycol (MEG), diethylene glycol (DEG), propylene glycol (PG) or dipropylene glycol (DPG), alkoxylates or oils of synthetic and/or natural origin.

The siloxanes may preferably be added to the composition for producing polyurethane foams in such an amount that the proportion by mass of the siloxanes in the finished polyurethane foam is from 0.01 to 10% by weight, preferably from 0.1 to 3% by weight.

It may be advantageous to produce and/or use in the production of the flexible polyurethane foam a composition which comprises at least the inventive compounds of formulae (1a) and (1b), at least one polyol component, optionally at least one isocyanate component and optionally one or more blowing agents and to react this composition.

In the context of the present invention the inventive compounds of formulae (1a) and (1b) expressly also encompass the correspondingly quaternized and/or protonated compounds. However, use of the compounds of formulae (1a) and (1b) in unquaternized and unprotonated form is particularly preferred in the context of the present invention. Possible quaternization of the compounds of formulae (1a) and (1b) may be carried out using any known reagents as quaternizing reagent. Preference is given to using alkylating agents such as dimethyl sulfate, methyl chloride or benzyl chloride, preferably methylating agents such as, in particular, dimethyl sulfate, as quaternizing agents. Quaternization can likewise be carried out using alkylene oxides, such as ethylene oxide, propylene oxide or butylene oxide, preferably with subsequent neutralization using inorganic or organic acids. If quaternized, the compounds of formulae (1a) and (1b) may be singly or multiply quaternized. It is preferable when compounds of formulae (1a) and (1b) are only singly quaternized. In the case of single quaternization the compounds of formulae (1a) and (1b) are preferably quaternized at a nitrogen atom. The compounds of formulae (1a) and (1b) may be converted into the corresponding protonated compounds by reaction with organic or inorganic acids. These protonated compounds may be preferable, for example, when, for example, a slowed polyurethane reaction is to be achieved or when the reaction mixture is to have enhanced flow behavior in use. As organic acids, it is possible to use, for example, all organic acids mentioned below, for example carboxylic acids having from 1 to 36 carbon atoms (aromatic or aliphatic, linear or branched), for example formic acid, lactic acid, 2-ethylhexanoic acid, salicylic acid and neodecanoic acid, or else polymeric acids such as polyacrylic or polymethacrylic acids. As inorganic acids, it is possible to use, for example, phosphorus-based acids, sulfur-based acids or boron-based acids.

It is preferable when the compounds according to formulae (1a) and (1b) are used in a total amount corresponding to a mass fraction of from 0.01 to 20.0 parts (pphp), preferably from 0.01 to 5.00 parts and particularly preferably from 0.02 to 3.00 parts, based on 100 parts (pphp) of polyol component.

The production of the polyurethane foams according to the invention can be carried out by all processes with which a person skilled in the art is familiar, for example in manual mixing processes or preferably with the aid of foaming machines, in particular low-pressure or high-pressure foaming machines. Batch processes or continuous processes may be used here.

It is possible to use all processes known to those skilled in the art for production of polyurethane foams. For example, the foaming operation can be effected either in the horizontal or in the vertical direction, in batchwise plants or continuous plants. The compositions employed according to the present invention are similarly useful for $CO_2$ technology. Use in low-pressure and high-pressure machines is possible, with the compositions to be processed being able to be metered directly into the mixing chamber or be admixed even before the mixing chamber with one of the components which then go into the mixing chamber. Admixture in the raw material tank is also possible.

A very particularly preferred flexible polyurethane foam for the purpose of the present invention has, in particular, the following composition:

| Component | Parts by weight (pphp) |
| --- | --- |
| Polyol | 100 |
| (Amine) catalyst | 0.01 to 5 |
| Tin catalyst | 0 to 5, preferably from 0.001 to 2 |
| Siloxane | 0.1 to 15, preferably from 0.2 to 7 |
| Water | 0 to <15, preferably from 0.1 to 10 |
| Further blowing agents | 0 to 130 |
| Flame retardant | 0 to 70 |
| Fillers | 0 to 150 |
| Further additives | 0 to 20 |
| Isocyanate index | greater than 50 |

The present invention further provides for the use of a combination of at least one compound of formula (1a) and at least one compound of formula (1b), where (1a) and (1b) are as defined in each case hereinabove, in the production of shaped PU foam articles, wherein the shaped PU foam article has been obtained by reaction of at least one polyol component and at least one isocyanate component in the presence of at least one blowing agent, to provide shaped PU foam articles having improved dimensional recovery after compression over a period of at least 20 hours.

The present invention further provides for the use of a combination of at least one compound of formula (1a) and at least one compound of formula (1b), where (1a) and (1b) are as defined in each case hereinabove, for improving the dimensional recovery of shaped PU foam articles after compression thereof over a period of at least 20 hours, wherein the shaped PU foam article is obtainable by reaction of at least one polyol component and at least one isocyanate component in the presence of at least one blowing agent in the presence of at least one compound of formula (1a) and at least one compound of formula (1b).

The present invention further provides for the use of flexible polyurethane foam in mattresses and/or cushions, in particular mattresses, wherein the flexible polyurethane foam has been obtained by reaction of at least one polyol component and at least one isocyanate component in the presence of at least one compound of formula (1a) and at least one compound of formula (1b), where (1a) and (1b) are each as defined above. In this respect, reference may be made, in particular, to what has been said above, which is also applicable to this subject matter.

The use according to the invention allows for the provision of mattresses and/or cushions having improved dimensional recovery after compression over a period of at least 20 hours. The use according to the invention allows for improved dimensional recovery of mattresses and/or cushions after compression thereof over a period of at least 20 hours.

The invention further provides a process for storing and/or for transporting shaped PU foam articles, preferably mattresses and/or cushions, wherein (a) in a first step a shaped PU foam article is provided by reaction of at least one polyol component and at least one isocyanate component in the presence of at least one compound of formula (1a) and at least one compound of formula (1b), where (1a) and (1b) are each as defined above, and at least one blowing agent, (b) in optional subsequent steps the obtained shaped PU foam article may optionally be subjected to further processing to prepare it for the application, (c) and wherein in a final step the shaped PU foam article (optionally prepared for the application) is compressed by at least 20%, preferably at least 30%, in particular at least 60%, based on its starting volume and optionally vacuum-packed and kept in compressed form by auxiliary means, in particular packaging means, and sent for storage and/or transport.

The invention further provides a mixture comprising at least one compound of formula (1a) and at least one compound of formula (1b), where (1a) and (1b) are each as defined above, and optionally glycols, polyethers and/or other solvents suitable for the purposes of PU foam production.

EXAMPLES

Physical properties of the flexible polyurethane foams:
The flexible polyurethane foams produced were assessed according to the following physical properties a) to g):

a) recession of the foam after the end of the rise phase (=settling): The settling, or the further rise, is found from the difference of the foam height after direct blow-off and after 3 minutes after foam blow-off. The foam height is measured at the maximum in the middle of the foam crest by means of a needle secured to a centimetre scale. A negative value here describes settling of the foam after blow-off; a positive value correspondingly describes further rise of the foam.

b) Foam height: The height of the freely risen foam formed after 3 minutes. Foam height is reported in centimetres (cm).

c) Rise time: The period of time between the end of mixing of the reaction components and the blow-off of the polyurethane foam.

d) Foam density (FD): Determined as described in ASTM D 3574-11 under Test A by measuring the core density. Foam density is reported in kg/m$^3$.

e) Porosity by dynamic pressure measurement: The gas permeability of the foam was determined in accordance with DIN EN ISO 4638:1993-07 by a dynamic pressure measurement on the foam. The dynamic pressure measured was reported in mm water column, and lower dynamic pressure values characterize a more open foam. The values were measured in the range from 0-300 mm.

The dynamic pressure was measured by means of an apparatus comprising a nitrogen source, reducing valve with pressure gauge, flow regulating screw, wash bottle, flow meter, T-piece, applicator nozzle and a graduated glass tube filled with water. The applicator nozzle has an edge length of 100×100 mm, a weight of 800 g, an internal diameter of the outlet opening of 5 mm, an internal diameter of the lower applicator ring of 20 mm and an external diameter of the lower applicator ring of 30 mm.

The measurement is carried out by setting the nitrogen admission pressure to 1 bar by means of the reducing valve and setting the flow rate to 480 l/h. The amount of water in the graduated glass tube is set so that no pressure difference is built up and none can be read off. For measurement on the test specimen having dimensions of 250×250×50 mm, the applicator nozzle is laid onto the corners of the test specimen, flush with the edges, and also once onto the (estimated) middle of the test specimen (in each case on the side having the greatest surface area). The result is read off when a constant dynamic pressure has been established.

Evaluation is effected by forming the average of the five measurements obtained.

f) Porosity by the air flow method: For better differentiability of open-cell content in the range from 0-60 mm of dynamic pressure, porosity was additionally measured by the air flow method with reference to ASTM D 3574 (2011-00) in addition to the dynamic pressure measurement. 12 test samples having dimensions of 5 cm×5 cm×2.5 cm were cut out of each of the finished foams and successively inserted into an analytical instrument constructed for this method. The construction of this instrument is described in ASTM D 3574 (2011-00). The analytical instrument generates an air pressure differential of 125 Pa between the inside of the instrument and the surrounding atmosphere by aspirating through the test specimen precisely sufficient air for the differential to be kept constant. The air flow through the test specimen is thus a measure of the porosity of the foam. Values in the range from 0-6 SCFM (standard cubic feet per min) were measured and relatively low values characterize a more closed foam.

g) Number of cells per cm (cell number): This is determined visually on a cut surface (measured to DIN EN 15702).

The analytical principles of VDA 278 are also described hereinbelow for the sake of completeness.

VDA 278 analytical principles:

The materials are characterized with regard to the type and the amount of the organic substances outgassable therefrom. To this end, two semi-quantitative empirical values are determined to estimate the emission of volatile organic compounds (VOC value) and also the proportion of condensable substances (fogging value). Individual substances of the emission are also determined. In the analysis, the samples are thermally extracted and the emissions are separated by gas chromatography and detected by mass spectrometry. The overall concentrations thus obtained for the VOC fraction are arithmetically converted into toluene equivalents and provide the VOC value as a result; the FOG fraction is represented in hexadecane equivalents and provides the FOG value.

The analytical method serves to determine emissions from non-metallic materials used for moulded parts in motor vehicles; they also include foams.

In thermal desorption analysis (TDA), small amounts of material are heated up in a desorption tube in a defined manner and the volatile substances which are emitted in the course of heating are cryofocused by means of an inert gas stream in a cold trap of a temperature-programmable vaporizer. After the heating phase has ended, the cold trap is rapidly heated to 280° C. The focused substances vaporize in the process. They are subsequently separated in the gas-chromatographic separation column and detected by mass spectrometry. Calibration with reference substances permits a semi-quantitative estimate of the emission, expressed in "µg/g". The quantitative reference substances used are toluene for the VOC analysis (VOC value) and n-hexadecane for the fogging value. Signal peaks can be assigned to substances using their mass spectra and retention indices. Source: VDA 278/10.2011, www.vda.de Analysis:

Test specimen: sample preparation, sampling and sample dimensions:

After the foams have been demoulded, they are stored at 21° C. and about 50% relative humidity for 24 hours. Samples of the moulding are then taken at suitable and representative sites distributed uniformly across the width of the (cooled) moulding. The foams are then wrapped in aluminium foil and sealed in a polyethylene bag.

The amount of the foam samples introduced into the desorption tubes is 10-15 mg in each case.

Test procedure: VOC/FOG thermal desorption:

The sealed samples are sent for direct determination immediately after receipt. The samples are weighed out on an analytical balance to an accuracy of 0.1 mg before starting the analysis and the corresponding amount of foam placed centrally in the desorption tube. A helium stream is passed over the sample and the latter heated to 90° C. for 30 minutes. All volatile substances are collected in a cold trap cooled with liquid nitrogen. After 30 minutes the cold trap is heated to 280° C. The vaporizing substances are separated from one another using the described gas chromatography column and then analysed by mass spectroscopy.

GC-MS instrument parameters.

The following instrument was used for the analysis:
from Gerstel
D 45473 Malheim an der Ruhr,
Eberhard-Gerstel-Platz 1 TDS-3/KAS-4
Tenax® desorption tube
Agilent Technologies 7890A (GC)/5975C (MS)
Column: HP Ultra2 (50 m, 0.32 mm, 0.52 µm)
Carrier gas: Helium Described below is the rolling deformation test which makes it possible to test dimensional recovery after compression in the context of the present invention. The rolling deformation test forms a further part of the subject matter of the invention.

Rolling Deformation Test:

Objective:

The test has for its object to simulate the conditions of rolled mattresses in the laboratory. Since there is no meaningful industry standard for this a novel test was developed which simulates the rolling-up of mattress foams on a small scale.

Sample Preparation:

Test specimens having dimensions of 12 cm (width), 16 cm (length) and 2.5 cm (thickness) are cut from the foam blocks as obtained from manual foaming for example using a band saw. A central position in the foam blocks from manual foaming is selected. The test specimen is cut out such that the rise direction of the foam during production is at right angles to the length and width of the test specimen. Test specimens are marked with a felt pen.

Test Procedure:

The test specimen is compressed with a thin metal rod of 5-8 mm diameter at a 12 cm edge. The foam test specimen is then rolled up around this metal rod by hand. The compresses the foam severely and a roll having a diameter of about 3-4 cm is formed. This role is held in this compressed state manually and placed completely into a cardboard tube. The cardboard tube has an internal diameter of 4 cm and a length of at least 13 cm. As soon as the rolled-up foam is fully inserted in the tube the metal rod is removed. To minimize friction during removal the metal rod may be lightly greased before the rolling of the foam. The foam then fills the volume of the tube. The compression of the form in the center is much more severe than at the edge of the tube. The role is then stored under controlled, constant conditions (temperature: 21° C., atmospheric humidity: 60%) for 7 days. After 168 hours the foam is manually removed from the tube, placed on a straight surface and the unrolling of the foam is observed. The expansion of the foam must not be disturbed or influenced.

Evaluation:

The foam is left to expand for 10 minutes. The test specimens are then evaluated. The most important criterion is whether the foam has completely recovered its original thickness or—especially at the more severely compressed edge—still has compression zones. In some cases a groove from the compression is still also apparent on the surface of the test specimen. Very poor test specimens remain rolled up at an end. A slight bend in the test specimen after expansion is normal and is not considered in the assessment. The following grades were used for the evaluation:

+++: Test specimen has fully unrolled, no compression lines or compressions apparent whatsoever, expansion occurs rapidly and is already complete after 5 min.

++: The test specimen has regained a thickness of 2.5 cm at all sites. No indentations and grooves remain visible at the surface after 10 minutes (particularly at the more severely compressed end).

+: The test specimen has regained a thickness of 2.5 cm at all sites. However, slight indentations and grooves remain visible at the surface (particularly at the more severely compressed end).

0: The test specimen exhibits a slight compression at the more severely compressed end. The thickness there is more than 2.0 cm but less than 2.5 cm. An indentation is clearly visible at this end.

−: Test specimen exhibits a slight compression at the more severely compressed end. The thickness of the sample there is more than 1 cm but still markedly less than 2.0 cm.

−−: Test specimen exhibits a severe compression at the more severely compressed end. The thickness of the sample there is less than 1 cm. The sample is still rudimentarily rolled up at this end.

−−−: Test specimen remains rolled up and compressed at the more severely compressed end.

The evaluation is preferably undertaken by at least two people. The results are documented. In the context of the present invention the evaluation was undertaken by four people who arrived at consistent results.

Failures and Constraints of the Test:

Correct dimensions of the test specimen and uniform rolling must be ensured in the test. The foam test specimen must have constant cell structure parameters, i.e. in particular a constant cell size and a constant air permeability. The metal rod must not be excessively greased so that no grease penetrates into the sample. Constant storage conditions must be maintained. Test specimens given the various evaluation grades must be kept available for comparison.

Precision of the Test:

Performance of the test with two or more people for evaluation regularly results in consistent assessments. In duplicate measurements too the same result was regularly confirmed. The test has thus proven eminently reliable.

Flexible Foam—Foaming Examples:

Example 1: Production of Flexible Polyurethane Foams (Flexible Slabstock Foam)

The performance testing of the inventive compounds of formulae (1a) and (1b) was carried out using the foam formulation specified in table 3.

TABLE 3

Formulation 1 for flexible slabstock foam applications

| Formulation 1 | Parts by mass (pphp) |
|---|---|
| Polyol 1[1) | 100 parts |
| Water | 4.00 parts |
| Tin catalyst[2) | 0.20 parts |
| Amine catalysts | variable |
| TEGOSTAB ®BF 2370[3) | 1.00 parts |
| Desmodur ® T 80[4) | 50.0 parts |

[1)Polyol 1: Voranol™ CP 3322 available from Dow Chemical; this is a glycerol-based polyether polyol having an OH number of 48 mg KOH/g.
[2)KOSMOS ® 29, obtainable from Evonik Industries: tin(II) salt of 2-ethylhexanoic acid.
[3) Polyether-modified polysiloxane, available from Evonik Industries.
[4)Tolylene diisocyanate T 80 (80% 2,4 isomer, 20% 2,6 isomer) from Covestro, 3 mPa · s, 48% NCO, functionality 2.

In the foaming operation 400 g of polyol were used in each case; the other formulation constituents were recalculated accordingly. 1.00 part of a component denoted 1.00 g of this substance per 100 g of polyol for example.

The foaming was carried out in the so-called manual mixing process. Formulation 1 as specified in table 3 with various amine catalysts was used. To this end polyol, the respective amine catalyst mixture, the tin catalyst tin(11) 2-ethylhexanoate, water and the foam stabilizer were initially charged to a paper cup and stirred at 1000 rpm for 60 seconds with a disc stirrer. After the first stirring the isocyanate (TDI) was added to the reaction mixture and stirred at 2500 rpm for 7 s and then immediately transferred into a paper-lined box (30 cm×30 cm base area and 30 cm height). After being poured in, the foam rose up in the foaming box. In the ideal case, the foam blew off on attainment of the maximum rise height and then fell back slightly. This opened the cell membranes of the foam bubbles and an open-pore cell structure of the foam was obtained. To assess the catalytic properties, the following characteristic parameters were determined: Rise time, rise height and dropping back of the foam after the end of the rise phase (=settling).

Defined foam bodies were cut from the resulting foam blocks and were analysed further. The following physical properties were determined on the test specimens: Cell number, porosity by dynamic pressure measurement and by the airflow method, foam density (FD) and rolling deformation at room temperature.

The results of the evaluation of the properties of the compounds according to the invention and the physical properties of the resulting flexible slabstock foams are summarized in Table 4. DABCO® DMEA was used as a comparative prior art catalyst. With the exception of the comparative catalyst equimolar amounts of amine were employed in each case and as a result the conversion to parts by weight based on 100 parts by weight of polyol resulted in slightly different usage amounts. For the comparative catalyst the smallest possible molar amount resulting in a qualitatively comparable foaming result was employed.

| | Amine | | | | |
|---|---|---|---|---|---|
| | DABCO® NE 750/ DABCO® NE 300 (3:1) Inventive | DABCO® NE 750/ DABCO® NE 310 (3:1) | DABCO® NE 1082/ DABCO® NE 300 (3:1) Inventive | DABCO® NE 1082/ DABCO® NE 310 (3:1) | DABCO® DMEA |
| Parts by mass (pphp) | 0.11 | 0.11 | 0.15 | 0.15 | 0.15 |
| Rise time (s) | 96 | 96 | 91 | 91 | 100 |
| Rise height (cm) | 31.5 | 31.6 | 29.4 | 29.6 | 28.4 |
| Settling (cm) | 0.3 | 0.3 | 0.0 | 0.2 | −0.2 |
| Cells (per cm) | 13 | 14 | 13 | 12 | 13 |
| Density (kg/m$^3$) | 23.9 | 24.1 | 24.0 | 24.4 | 24.7 |
| Porosity (mm water column) | 13 | 10 | 13 | 16 | 20 |
| Porosity (SCFM) | 3.57 | 3.73 | 2.71 | 2.50 | 3.24 |
| Rolling deformation (7 d, 21° C.) | ++ | 0 | + | − − | − − |

A comparable cell number and porosity are crucial especially for a precise reproducibility of the rolling deformation test. The catalyst usage amount was chosen such that the finished foams had a cell number of 12-14 cells per centimeter and a porosity of below 30 mm water column. The airflow method is markedly more precise in this open-celled porosity range. For this reason a porosity between 2.00 and 4.00 SCFM by this method was chosen and in the individual comparative pairs a maximum porosity difference of ±0.4 was chosen.

As is apparent from table 4 the inventive combination of a compound of formula (1a) (here DABCO® NE 300) with a compound of formula (1b) (here DABCO® NE 750 and DABCO® NE 1082) shows significant advantages in the rolling deformation test compared to noninventive combinations of catalysts.

The recovery of the original shape of the test specimens after rolling deformation was quite decisively improved. Thus all foam bodies produced with the inventive combination of emission-free blowing and gel catalysts recover their original thickness of 2.5 cm and exhibit only light grooves, if any, at the surface after 10 min of resting time. By contrast, the foam specimens produced with noninventive catalysts all exhibit foam compressions and to varying extents of severity fail to recover their original foam height and shape. The foams according to the invention also proved particularly low in emissions with regard to amine emissions. The advantageous nature of the invention was also confirmed in the case of other types of foam, such as cold-cured flexible foams (slabstock and moulded foams) and viscoelastic foams.

The invention claimed is:

1. A shaped polyurethane foam article, wherein the shaped polyurethane foam article has been obtained by reaction of at least one polyol component and at least one isocyanate component in the presence of a compound (1a) and at least one compound of formula (1b) and at least one blowing agent, wherein formula (1b) is defined as follows:

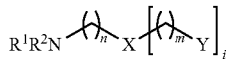

formula (1b)

wherein in formula (1b):

X represents nitrogen, amines of formula $NR^3R^4$, urea of formula $N(R^5)C(O)N(R^6)$ or urea of formula $N(R^5)C(O)NR^6R^7$, Y represents an amine group of formula $NR^8R^9$ or an ether group of formula $OR^9$, $R^1$ and $R^2$ represent identical or different hydrocarbon radicals having 1 or 3 carbon atoms optionally bearing an OH group, $R^3$ and $R^4$ represent hydrogen or methyl, $R^5$, $R^6$ and $R^7$ represent hydrogen, and $R^8$ and $R^9$ represent methyl, m=3, n=3, i=0 to 2, wherein at least one of the groups X, Y, OF $R^1$, $R^2$, $R^3$, $R^4$, $R^5$, $R^6$, and $R^7$, bears a functionality which is reactive with a component which forms the polyurethane matrix, based on its starting volume the shaped polyurethane foam article is compressed by at least 30% and kept in compressed form by an auxiliary means for at least 20 hours said compound (1a) is N, N, N'-trimethyl-N'-(3-aminopropyl) bis (aminoethyl) ether and said shaped polyurethane foam article has a rebound resilience of 1 to <10%, measured in accordance with DIN EN ISO 8307:2008-03.

2. The shaped polyurethane foam article according to claim 1, wherein the shaped polyurethane foam article is the flexible polyurethane foam and wherein based on its starting volume the shaped polyurethane foam article is compressed by at least 60% and kept in compressed form by an auxiliary means for at least 20 hours.

3. The shaped polyurethane foam article according to claim 2, wherein a flexible polyurethane foam has a foam density of 5 to 150 kg/m$^3$ and/or a porosity, optionally after crushing the flexible polyurethane foam article, of 1 to 250 mm, water column.

4. The shaped polyurethane foam article according to claim 2, wherein the flexible polyurethane foam has a compressive strength CLD, 40% in accordance with DIN EN ISO 3386-1:2015-10, of 0.1 to 8.0 kPa.

5. The shaped polyurethane foam article according to claim 2, wherein the flexible polyurethane foam is a hot-cured flexible polyurethane foam having a compressive strength CLD, 40% in accordance with DIN EN ISO 3386-1:2015-10, of 2.0-8.0 kPa, and/or a foam density of 8 to 80 kg/m$^3$ and/or a porosity of 1 to 250 mm, water column.

6. The shaped polyurethane foam article according to claim 2, wherein the flexible polyurethane foam is a viscoelastic flexible polyurethane foam and has a glass transition temperature between −20° C. and +15° C. and/or a compressive strength CLD, 40% in accordance with DIN EN ISO 3386-1:2015-10, of 0.1-5.0 kPa, and/or a foam density of 30 to 130 kg/m$^3$ and/or a porosity, after crushing the foam, of 1 to 250 mm water column.

7. The shaped polyurethane foam article according to claim 1, wherein the shaped polyurethane foam article has a height of from at least 1 cm to not more than 50 cm and a width of from at least 20 cm to not more than 300 cm, and a length of from at least 20 cm to not more than 300 cm.

8. The shaped polyurethane foam article according to claim 1, wherein the shaped polyurethane foam article is in a compressed and a vacuum-packed state.

9. The shaped polyurethane foam article according to claim 8, wherein the shaped polyurethane foam article is a rollup mattress.

10. A process for storing and/or for transporting the shaped polyurethane foam article as set forth in claim 1, wherein (d) in a first step a shaped polyurethane foam article is provided by reacting of at least one polyol component and at least one isocyanate component in the presence of the compound (1a) and at least one compound of formula (1b), and the at least one blowing agent, (e) in optional subsequent steps further processing the obtained shaped foam article, (f) and wherein in a final step compressing the shaped polyurethane foam article by at least 20%, based on its starting volume and optionally vacuum packing the shaped polyurethane foam article, followed by keeping the shaped polyurethane foam article in compressed form by auxiliary means, and storing and/or transporting the shaped polyurethane foam article.

11. A mattress comprising the shaped polyurethane foam article as set forth in claim 1.

12. The shaped polyurethane foam article according to claim 1, wherein in formula (1b):

X is selected from the group consisting of a urea $N(R^5)C(O)NR^6R^7$ or nitrogen, Y represents $NR^8R^9$, where $R^8$ and $R^9$=methyl, $R^1$ and $R^2$ is selected from the group consisting of methyl, ethyl, iso-propyl, —$C_2H_3(OH)CH_3$ or —$C_2H_4OH$, m=3
n=3,
i=0 to 2,
wherein at least one of the groups X, Y, $R^1$ and $R^2$ bears an isocyanate-reactive functionality reactive with a component which forms the polyurethane matrix.

13. The shaped polyurethane foam article according to claim 1, wherein in formula (1b):

X is selected from the group consisting of a urea $N(R^5)C(O)NR^6R^7$ or nitrogen, Y represents $NR^8R^9$, where $R^8$ and $R^9$=methyl, $R^1$ and $R^2$ are methyl, $R^5$, $R^6$ and $R^7$ are hydrogen, m=3, n=3, i=1 or 2, wherein at least one of the groups X or Y bears a NH or OH functionality reactive with a component which forms the polyurethane matrix.

14. The shaped polyurethane foam article according to claim 1, wherein in formula (1b):

X is selected from the group consisting of a urea $N(R^5)C(O)NR^6R^7$ or nitrogen, Y represents —$NR^8R^9$, where $R^8$ and $R^9$=methyl, $R^1$ and $R^2$ are methyl, $R^5$, $R^6$ and $R^7$ are hydrogen, m=3, n=3, i=1 or 2, wherein at least one of the groups X, Y, $R^5$, $R^6$ and $R^7$ bears a NH or OH functionality reactive with a component which forms the polyurethane matrix.

15. The shaped polyurethane foam article according to claim 1, wherein the shaped polyurethane foam article has a foam density of 5 to 150 kg/m$^3$ and/or a porosity, after crushing the shaped polyurethane foam article, of 1 to 50 mm, water column.

16. The shaped polyurethane foam article according to claim 1, wherein the shaped polyurethane foam article has a height of from at least 1 cm to not more than 50 cm and a width of from at least 70 cm to not more than 200 cm, and a length of from at least 150 cm to not more than 220 cm.

17. The shaped polyurethane foam article according to claim 1, wherein said at least one compound of formula (1b) is at least one selected from the group consisting of 1,3-bis[3-(dimethylamino)propyl]urea and (N,N-dimethylaminopropylamine).

* * * * *